United States Patent [19]
Pielartzik et al.

[11] Patent Number: 4,886,869
[45] Date of Patent: Dec. 12, 1989

[54] THERMOTROPIC AROMATIC POLYESTER CARBONATES, A PROCESS FOR THEIR PREPARATION AND THEIR USE

[75] Inventors: Harald Pielartzik; Rolf Dhein; Rolf-Volker Meyer; Hans-Joachim Traenckner, all of Krefeld; Edgar Ostlinning, Duesseldorf, all of Fed. Rep. of Germany

[73] Assignee: Bayer Aktiengesellschaft, Leverkusen, Fed. Rep. of Germany

[21] Appl. No.: 231,138

[22] Filed: Aug. 11, 1988

[30] Foreign Application Priority Data

Aug. 20, 1987 [DE] Fed. Rep. of Germany ....... 3727729

[51] Int. Cl.$^4$ .............................................. C08G 63/64
[52] U.S. Cl. .................................... 528/196; 528/193; 528/201; 528/204
[58] Field of Search ................ 528/193, 196, 201, 204

[56] References Cited

U.S. PATENT DOCUMENTS 4,579,934  4/1986  Brinkmeyer et al. ................ 528/193

Primary Examiner—Harold D. Anderson
Assistant Examiner—T. Mosley
Attorney, Agent, or Firm—Connolly & Hutz

[57] ABSTRACT

Thermotropic fully aromatic polyester carbonates containing condensed residues of optionally substituted 3-hydroxybenzoic acid have great rigidity, impact strength and elongation at break and yet can be processed under the usual conditions owing to their advantageous fusion viscosity.

10 Claims, No Drawings

THERMOTROPIC AROMATIC POLYESTER CARBONATES, A PROCESS FOR THEIR PREPARATION AND THEIR USE

This invention relates to fully aromatic, thermotropic polyester carbonates with high impact strength and elongation at break and advantageous fusion viscosity, to a process for their preparation and to their use for the production of moulded bodies, filaments, foils and fibres.

"Thermotropic" is the term applied to substances which form liquid-crystalline melts. Thermotropic polycondensates are well known, see e.g.:

F. E. McFarlane et al, Liquid Crystal Polymers II, Contemporary Topics in Polymer Science, Vol. 2, Plenum Publishing Corporation 1977;

W. J. Jackson and H. F. Kuhfuss, J. Polymer, Polymer Chem. Ed. 14, 2042 (1976);

W. C. Wooten et al, in A. Ciferri "Ultra-high Modules Polymers", Applied Science Publ., London 1979, pages 362 et seq;

A. Blumstein et al, "Liquid Crystalline Order in Polymers", Academic Press 1978;

J. Preston, Angew. Makromol. Chem. 109/110, pages 1-19 (1982);

A. Ciferri, W. R. Krigbaum, R. B. Meyer "Polymer Liquid Crystals", Academic Press, New York, 1982;

EP 1185, 1340, 8855, 11 640, 15 856, 17 310, 18 145, 18 709, 22 344, 44 205 and 49 615;

US 39 91 013, 39 91 014, 40 66 620, 40 67 852, 40 83 829, 41 07 143, 42 26 970, 42 32 143, 42 32 144, 42 45 082, 42 69 965, 43 35 232, 43 81 389, 43 99 270, 43 98 015, 44 47 592 and 45 00 699; JP 59/1 26 431; WO 79/792, 79/1 030 and 79/1 040.

The liquid-crystalline state of polymer melts may be investigated by means of a polarization microscope. For the investigations carried out, the eyepiece was equipped with an attachment containing a photoelectric diode at the focal point of the lens. A measuring amplifier with regulating device was used to adjust the value measured on the microscope to 100 scale divisions when the microscope was switched on with Nicols prisms arranged in parallel in the absence of a sample of material. The value obtained with crossed Nicols prisms was then 0.01 scale division.

The polycondensates were examined after the samples had been melted at temperatures from 280° to 400° C. If any brightening of the melt was observed between the crossed Nicols prisms in all or part of this region, the polycondensate was graded as thermotropically liquid crystalline.

The liquid-crystalline polycondensates give values above one scale division in the measuring arrangement, in most cases values from 3 to 90 scale divisions. For amorphous melts, e.g. aromatic polycarbonates, values of less than 0.1 scale division were found.

The method described above is particularly suitable for a rapid determination in the laboratory and gives unequivocal results in almost all cases. In cases of doubt, it may be advisable to confirm the presence of liquid-crystalline components by X-ray scattering in the melt as described, for example, in "Plastic Crystals, Physico-Chemical Properties and Methods of Investigation" by G. W. Gray and P. A. Windsor, in particular Chapter 3, John Wiley and Sons, New York, Sydney, Toronto 1974.

Moulded bodies produced from liquid crystalline melts have rigidities of a degree not normally found in unreinforced polycondensates which can be worked up from isotropic melts but the elongation at break and the low toughness of such products are in many respects unsatisfactory (DE-OS 2 704 315, U.S. Pat. No. 4 371 660 and EP 0 213 609).

Investigations have confirmed that thermotropic polymers which have great rigidity, i.e. a high modulus of elasticity, have low elongation at break and toughness and thermotropic polymers which have great elongation at break and toughness have less rigidity (U.S. No. 4 242 496, EP 205 855).

Liquid crystal polyester carbonates obtained from hydroquinone, tert.-butylhydroquinone, terephthalic acid and carbonic acid are described in U.S. Pat. Nos. 4 435 561 and 4 398 018. These polymers decompose by the elimination of isobutene (from tert.-butyl-hydroquinone) to an extent which depends on time and temperature and they have considerable processing defects. Liquid crystalline polyester carbonates obtained from 6-hydroxynaphthoic acid, hydroquinone, aromatic dicarboxylic acids and carbonic acid are described in U.S. Pat. No. 4 371 660. These products have a moderate rigidity (determined on fibres) combined with low elongation at break (2%). Polyester carbonate imides obtained from 5-carboxy phthalimides, aliphatic and/or aromatic diamines or aminophenols, diphenols, aromatic dicarboxylic acids, p-hydroxybenzoic acid and carbonic acid are described in EP 0 213 362 and 0 213 609. Their elongation at break of 1.5% combined with a tear resistance of 170 MPa is unsatisfactory.

LC polymers of the prior art, for example, have a high level of toughness combined with low strength and elongation (EP 0 132 637) or high strength combined with low elongation at break and toughness (DE-OS 2 704 315 and U.S. Pat. No. 4 371 660).

Since a combination of great toughness, rigidity and elongation at break is required for many practical applications but not always found in the known thermotropic, fully aromatic LC polymers, an improvement in this combination of properties is very important.

It was therefore an object of the present invention to provide thermotropic, fully aromatic polyester carbonates which would have a higher level of toughness, elongation at break and rigidity than the polyester carbonates of EP 0 132 637, DE-OS 2 704 315 and U.S. Pat. No. 4 371 660.

It has now surprisingly been found that fully aromatic, thermotropic polyester carbonates containing condensed residues of angular aromatic hydroxycarboxylic acids have the desired combination of advantageous properties.

This invention therefore relates to thermotropic, aromatic polyester carbonates based on (a) optionally substituted aromatic hydroxycarboxylic acids,
(b) diphenols,
(c) carbonic acid and optionally
(d) aromatic dicarboxylic acids, in which part of the aromatic hydroxycarboxylic acid is present as optionally substituted 3-hydroxybenzoic acid (e) and which conform to the following molar ratios, apart from the end groups:

$a+b=1,$ $b=c+d,$ e/a=0.02–0.50, preferably 0.05–0.40, most preferably 0.10–0.35 and $$\frac{c}{c+d} = 0.2\text{-}1;$$

in molar fractions:
a=0.3–0.95, preferably 0.5–0.85
b=0.05–0.7, preferably 0.15–0.5
c=0.05–0.70, preferably 0.15–0.50
d=0.0.70, preferably 0–0.4
e=0.05–0.50, preferably 0.1–0.35.

The aromatic hydroxycarboxylic acids (a) may be, for example, compounds corresponding to the following formula:

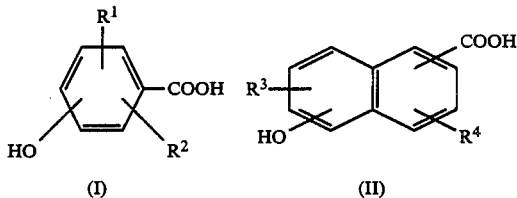

wherein $R^1$ to $R^4$ denote $C_1$–$C_4$-alkyl (preferably methyl or ethyl), $C_1$–$C_4$-alkoxy (preferably methoxy or ethoxy), $C_6$–$C_{10}$-aryl or aryloxy (preferably phenyl, phenyloxy, naphthyl, naphthyloxy, biphenyl, biphenyloxy, tolyl or tolyloxy), $C_7$–$C_{12}$-alkylaryl (preferably benzyl), halogen (preferably chlorine or bromine) or hydrogen and the valencies between the nucleus and the hydroxyl groups and between the nucleus and the carboxyl group form an angle of from 45° to 180°.

The following are examples of preferred aromatic hydroxycarboxylic acids (a): 4-Hydroxy-3-methylbenzoic acid, 4-hydroxy-3-phenylbenzoic acid, 4-hydroxy-2-ethylbenzoic acid, 3-chloro-4-hydroxybenzoic acid, 3-bromo-4-hydroxybenzoic acid, 4-hydroxy-3-methoxybenzoic acid, 4-hydroxybenzoic acid, 6-hydroxynaphthoic acid, 4-hydroxy-3-phenoxybenzoic acid, 6-hydroxy-5-chloro-2-naphthoic acid, 6-hydroxy-5-methyl-2-naphthoic acid, 6-hydroxy-5-methoxy-2-naphthoic acid, 6-hydroxy-4,7-dichloro-2-naphthoic acid and 2-hydroxybenzoic acid. 4-Hydroxybenzoic acid and 6-hydroxynaphthoic acid are particularly preferred.

The following are examples of optionally substituted 3-hydroxybenzoic acids (e): 3-Hydroxy-4-methylbenzoic acid, 3-hydroxy-4-phenylbenzoic acid, 3-hydroxy-2-ethylbenzoic acid, 4-chloro-3-hydroxybenzoic acid, 4-bromo-3-hydroxybenzoic acid, 3-hydroxy-4-methoxybenzoic acid, 3-hydroxy-4-phenoxybenzoic acid, 3-hydroxy-2-methoxybenzoic acid and 3-hydroxybenzoic acid.

Unsubstituted hydroxycarboxylic acids such as 3-hydroxybenzoic acid are particularly preferred aromatic 3-hydroxycarboxylic acids (e).

The diphenols (b) may be compounds corresponding to the following formula:

HO—Z—OH    (III)

wherein

Z denotes a divalent mononuclear or higher nuclear aromatic group containing 6 to 30 carbon atoms which is so constructed that each of the two OH groups is directly attached to a carbon atom of an aromatic system and the two valencies form an angle of from 45° to 180°.

The aromatic groups may be substituted by 1 to 4 $C_1$–$C_4$-alkyl, $C_1$–$C_4$-alkoxy, phenyl, phenoxy or benzyl groups or by halogen (preferably chlorine or bromine) and cover phenylene, naphthylene and biphenylene as well as phenylene groups which are attached by oxygen, sulphur, carbonyl, sulphonyl, $C_1$–$C_4$-alkylene or alkylidene, cyclohexylene or hexylidene or —O(CH$_2$)$_n$O where n=2–4.

The following are examples of preferred diphenols (b): Hydroquinone, 4,4'-dihydroxydiphenyl, 4,4'-dihydroxydiphenylether, 4,4'-dihydroxydiphenylethane, 4,4'-dihydroxydiphenoxyethane, 3,5'-dihydroxydiphenyl, 3,5'-dihydroxydiphenylether, 1,5-dihydroxynaphthalene, 2,6-dihydroxynaphthalene, 1,4-dihydroxynaphthalene, chlorohydroquinone, bromohydroquinone, methylhydroquinone, phenylhydroquinone, ethylhydroquinone, 2,2'-dimethyl-4,4'-dihydroxydiphenyl, 3,3',5,5'-tetramethyl-4,4'-dihydroxydiphenyl, 3,5'-dimethoxy-4,4'-dihydroxydiphenylether, 1,2-(2-chloro-4-hydroxyphenoxy)-ethane, 4-methoxy-2,6-dihydroxynaphthalene, resorcinol, 3,4'-dihydroxydiphenyl, 3,4'-dihydroxydiphenylether, 3,4'-dihydroxydiphenoxyethane, 1,3-dihydroxynaphthalene, 1,6-dihydroxynaphthalene, 1,7-dihydroxynaphthalene, 2,7-dihydroxynaphthalene, 4-chlororesorcinol, 4-bromoresorcinol, 4-methylresorcinol, 4-phenylresorcinol, 4-ethoxyresorcinol, 2,5-dichloro-1,6-dihydroxynaphthalene and 4-methoxy-2,7-dihydroxynaphthalene.

Hydroquinone and 4,4'-dihydroxydiphenyl are particularly preferred diphenols (b).

The following are suitable derivatives for the incorporation of carbonate groups (c): Diarylcarbonates such as diphenylcarbonate, ditolylcarbonate, phenyl-tolyl-carbonate and dinaphthylcarbonate, dialkylcarbonates such as diethylcarbonate, dimethylcarbonate and glycol carbonate.

Diphenylcarbonate is a preferred derivative for the incorporation of carbon groups (c).

The aromatic dicarboxylic acids (d) may be compounds corresponding to the following formula:

HOOC—A—COOH    (IV)

wherein

A denotes a bivalent aromatic group with 6 to 24 carbon atoms, preferably 6 to 16 carbon atoms, and the two valencies form an angle of from 45° to 180°. The bivalent aromatic groups may be substituted with 1 to 4 $C_1$–$C_4$-alkyl, $C_1$–$C_4$-alkoxy, phenyl, phenoxy, benzyl or halogen groups (preferably chlorine and bromine) and include not only phenylene, naphthylene and biphenylene but also phenylene groups attached by oxygen, sulphur, carbonyl, sulphonyl, $C_1$–$C_4$-alkylene or alkylidene, cyclohexylene or hexylidene or by —O(CH$_2$)$_n$O wherein n=1–4.

The following are examples of preferred aromatic groups: 1,4-Phenylene, 1,4-naphthylene and 4,4'-biphenylene, in which the two bonds extend coaxially in opposite directions; 1,5-Naphthylene, 2,6-naphthylene and 3,5'-biphenylene in which the two bonds extending in opposite directions are shifted parallel to one another; and 1,3-phenylene, 1,3-, 1,6-, 1,7- and 2,7-naphthylene and 3,4'-biphenylene in which the two bonds are not localized at adjacent atoms and do not extend with a coaxial or parallel shift in opposite directions.

The following are examples of preferred aromatic dicarboxylic acids (d): 1,4-Naphalenedicarboxylic acid, 1,5-naphthalenedicarboxylic acid, 2,6-naphthalenedicarboxylic acid, biphenyl-4,4'-dicarboxylic acid, biphenyl-3,3'-dicarboxylic acid, diphenoxyethane-4,4'-dicarboxylic acid, diphenylether-4,4'-dicarboxylic acid, methylterephthalic acid, methoxyterephthalic acid, chloroterephthalic acid, 4-chloronaphthalene-2,7-dicarboxylic acid, 1,3-naphthalenedicarboxylic acid, 1,6-naphthalenedicarboxylic acid, 1,7-naphthalenedicarboxylic acid, 2,7-naphthalenedicarboxylic acid, biphenyl-3,4'-dicarboxylic acid, diphenylether-3,4'-dicarboxylic acid, 4-methylisophthalic acid, 5-methylisophthalic acid, diphenylether-4,4'-dichloro-3,3'-dicarboxylic acid and iso- and terephthalic acid.

Iso- and terephthalic acid are particularly preferred aromatic dicarboxylic acids (d).

The polyester carbonates according to the invention may contain H, OH, $OC_6H_5$ or residues of chain breakers as end groups.

The polyester carbonates according to the invention may contain the residues of compounds (a) to (e) in random distribution or in blocks.

The polyester carbonates according to the invention have a structural viscosity and their fusion viscosity at $T=330°$ C. and $\dot{\gamma}=1000$ $s^{-1}$ (shear rate) is at least 20 Pas, preferably 40 Pas.

The new thermotropic, fully aromatic polyester carbonates may be thermoplastically processed in conventional processing apparatus at temperatures below 370° C. and advantageously below a temperature of 340° C. They are preferably processed at temperatures of about 280° C. to 340° C.

The new thermotropic, fully aromatic polyester carbonates have very high impact strength, in some cases over 140kJ/$m^2$. In addition, the polyester carbonates according to the invention have a very high tear resistance, in some cases above 200 MPa. The preferred polyester carbonates also have an elongation at break of at least 2%, preferably at least 2.5%, most preferably at least 3.0%.

It is particularly surprising that these new polyester carbonates manifest this advantageous, hitherto unknown combination of properties and it was not foreseeable for the man of the art since the desired combination of properties cannot be obtained by the incorporation of other angular monomer units such as resorcinol or bisphenol A or by an increase in the isophthalic acid content (Comparison Examples 1, 2 and 3).

The polyester carbonates according to the invention are prepared by the transesterification of the phenyl esters with the phenolic compounds in the melt followed by polycondensation with elimination of phenol. Phenol is distilled from the reaction mixture until the desired degree of condensation has been reached. In a preferred process, the carboxylic acids are converted into the arylesters by reaction with a diarylcarbonate, preferably diphenylcarbonate, and the arylester is then reacted with the phenolic compounds.

It is preferred to employ a process by which the thermotropic polymers may be prepared by a one-shot reaction such that formation of the derivative and polycondensation are carried out in one reaction vessel without the isolation of intermediate stages. Derivatization of the carboxyl groups should preferably be carried out by a reaction with diphenylcarbonate with elimination of $CO_2$ and formation of the phenyl esters. As polycondensation progresses, these phenyl esters react with the diphenols with the liberation of phenol.

The residues of compounds (a) to (e) are incorporated in the polyester carbonate in the proportions in which they are present in the starting components. An exception to this is diarylcarbonate used in the preferred embodiment of the transesterification process described above. This component is required as reactant for the formation of the carboxylic acid arylester and for the formation of the carbonate groups in the polyester carbonate.

In a preferred method of carrying out the process, reactants (a) to (e) are mixed in the required proportions. The required quantity of diarylcarbonate is calculated as follows:

(a, e) optionally substituted hydroxybenzoic acid
(b) diphenol
(c) dicarboxylic acid
(d) diarylcarbonate $$[d]=[a, e]+2[c]+([b]-[c]).$$

In the preferred method of carrying out the transesterification process, the diarylcarbonate is required both as reaction component for the formation of the carboxylic acid phenylester and as component for forming the carbonate groups in the polyester carbonate.

The eqivalent ratio of diarylcarbonate/carboxylic acid derivative in the preferred procedure is therefore at least 1:1, preferably from 1.01 to 1.1:1.

It is clear from the term ([b]−[c]) that the amount of condensed carbonate groups is determined by the equivalent ratio of dicarboxylic acid to diphenol.

Both the esterification of transesterification reactions and the polycondensation reactions are preferably catalysed. Suitable catalysts for this purpose include, as is known, oxides, hydrides, hydroxides, halides, alcoholates, phenolates, salts of inorganic or organic acids, complex salts or mixed salts of alkali metals such as lithium, sodium or potassium, of alkaline earth metals such as magnesium or calcium, of sub-Group Elements such as vanadium, titanium, manganese, cobalt, nickel, zinc, lanthanum, cerium or zirconium or of Elements from other Groups of the Periodic System, such as germanium, tin, lead or antimony or the alkali metals or alkaline earth metals as such. The following are particular examples: Sodium, sodium hydroxide, lithium acetate, sodium acetate, potassium acetate, calcium acetate, magnesium acetate, cobalt acetate, zinc acetate, calcium benzoate, magnesium acetylacetonate, zinc acetylacetonate, titanium tetrabutylate, titanium tetrapropylate, zirconium butylate, zirconium propylate, titanium tetraphenolate, sodium phenolate, germanium dioxide, antimony trioxide, dibutyl tin diacetate and dibutyl dimethoxy tin.

The following may also be used as catalysts: Cyclic and/or bicyclic aromatic or aliphatic bases containing 2 to 3 nitrogen atoms. The following are examples: Imidazole, 4,5-diphenyl-1H-imidazole, 1,10-phenanthroline, 2,2'-dipyridyl, 1H-benzimidazole, 1,2-dimethyl-1H-benzimidazole, 2-methyl-1H-imidazole, 1-methyl-1H-imidazole, 1H-pyrazole 4-dimethylaminopyridine, 4-pyrrolidinopyridine, 1,8-bis-(dimethylamino)-naphthalene and 1,8-diazabicyclo-5,4,0-undec-2-ene, 1,8-diazabicyclo-4,3,0-non-5-ene, 1,4-diazabicyclo-2,2,2-octane and 1,4,5,6-tetrahydro-1,2-dimethylpyrimidine. Imidazole and/or imidazole derivatives are preferably used, especially imidazole.

The catalysts mentioned above may also be used as mixtures with one another.

The catalysts are used in quantities of about 0.001 to 5 mol-%, preferably 0.01 to 2.5 mol-%, based on the carboxylic acid weighed into the reaction mixture or derivatives thereof. The most suitable quantity of catalyst may easily be determined by preliminary tests. The quantity depends on the nature of the particular catalyst or catalyst mixture used.

The reaction temperatures employed in the preferred transesterification process are about 150° C. to 350° C. The reaction is started at low temperatures and the temperature is continuously raised as the reaction progresses. A vacuum may be applied when the reaction slows down, the pressure being preferably lowered continuously from normal pressure to about 0.1 mbar.

The reaction may in principle be followed by a solid phase post-condensation at temperatures of up to about 250° C. The fusion viscosities then rise and the mesomorphous polyester carbonates according to the invention become insoluble in p-chlorophenol. This post-condensation, however, is generally unnecessary.

Molecular weight regulation is sometimes desired. This may be brought about by monofunctional compounds which stop the polycondensation reactions.

Monofunctional compounds in this sense are monofunctional carboxylic acids, preferably aromatic carboxylic acids such as benzoic acid, chlorobenzoic acids, methylbenzoic acids, naphthalene carboxylic acids or diphenylcarboxylic acids; monofunctional aromatic hydroxy compounds such as phenol, methylphenols, ethylphenols, p-nonylphenol, p-chlorophenol, 4-(1,1-dimethylpropyl)phenol, 4-(1,1,3,3-tetramethylbutyl)phenol, dodecylphenols, dimethylphenol, hydroxynaphthalenes and monofunctional thiophenols such as thiopheol itself or 4-methylthiophenol. 4-Hydroxybiphenyl is preferably used.

The invention thus also relates to a process for the preparation of the new thermotropic, aromatic polyester carbonates based on (a) optionally substituted aromatic hydoxycarboxylic acids,
(b) diphenols,
(c) carbonic acid and optionally
(d) aromatic dicarboxylic acids, part of the aromatic hydroxycarboxylic acid being present as optionally substituted 3-hydroxybenzoic acid (e) and the molar ratios conforming to the following conditions (excluding the end groups):

$a+b=1$, $b=c+d$, $e/a=0.02-0.50$, preferably 0.05–0.40, most preferably 0.10–0.35 and $$\frac{c}{c+d} = 0.2-1;$$

in moar fractions:
$a=0.3-0.95$, preferably 0.5–0.85,
$b=0.05-0.7$, preferably 0.15–0.5,
$c=0.05-0.70$, preferably 0.15–0.50,
$d=0-0.70$, preferably 0–0.4, and
$e=0.05-0.50$, preferably 0.1–0.35, characterised in that (a) optionally substituted aromatic hydroxycarboxylic acids,
(d) aromatic dicarboxylic acids and
(e) optionally substituted 3-hydroxybenzoic acid are esterified with (c) diarylcarbonate, and the aryl ester obtained is transesterified with (b) diphenol, diarylcarbonate and optionally chain breaking agents and then polycondensed at temperatures of from 150° to 350° C. in the presence of 0.001 to 5 mol-% of catalyst, based on the quantity of carboxylic acids or their derivatives, optionally at reduced pressure.

Owing to the relatively low fusion viscosity of the thermotropic polyester carbonates according to the invention, they may advantageously be worked up from the melt for the production of injection moulded parts, fibres and films. The shearing forces produced result in molecular orientation which its to a large extent influenced by the magnitude of the shearing forces. These polyester carbonates also have a marked structural viscosity, i.e. the fusion viscosity drops sharply as the shearing forces increase.

Another essential feature of the aromatic, thermotropic polyester carbonates according to the invention is their high impact strength.

Moulded parts of high tensile strength, exceptionally high toughness and high dimensional stability may be produced from the polyester carbonates according to the invention. Since the polyester carbonates are extremely chemically-resistant and flame-resistant, they are eminently suitable for the manufacture of electrotechnical articles such as insulators, printed circuits, plug-and-socket contacts and electric fittings, parts of chemico-technical apparatus such as pipes, containers linings, rotors, friction bearings and seals, parts of the internal fittings of aircraft, parts of medical technical apparatus, and parts of air conditioning installations and valves.

Owing to their particular properties, the polyester carbonates according to the invention are also suitable for the production of films and fibres.

The invention therefore also relates to the use of the new polyester carbonates for the manufacture of moulded articles, filaments, fibres and films.

Although it was already known to replace part of the aromatic hydroxycarboxylc acid by 3-hydroxybenzoic acid for the preparation of thermotropic aromatic polyesters (see Appl. Chem. Macromol. Symp. 28, page 800 (1982), DE-OS 21 644 73, Macromol. Chem., Rapid Commun. 8, 159 (1987)), it was still surprising that in spite of the increase in chain flexibility, liquid crystalline polyester carbonates having the unusual combination of properties of great rigidity and elongation at break with great toughness could be obtained by the incorporaition of an additional angular monomer unit by condensation, since impairment in properties and loss of the LC character is reported to take place when 3-hydroxybenzoic acid is incorporated in liquid-crystalline polyesters (Macromolecules, 16, 1227 (1983)).

It is also reported that copolymers of 4- and 3-hydroxybenzoic acid can only be obtained by a special process of condensation (decomposition of trimethylsilyl chlorode; Polymere 1982, Vol. 23, page 1821).

The following Examples serve to illustrate the process according to the invention which is, however, not limited to these Examples.

EXAMPLES

The test for impact strength $a_n$ and notched impact strength $a_k$ was carried out on 80×10×4 mm test samples according to DIN 53 453 (ISO/R 179) at 23° C., using 10 ten samples for each test.

The flexural strength was determined on 80×10×4 mm test samples according to DIN 53 452 (ISO/R 178). The flexural-E modulus was determined according to DIN 53 457.

Determination of the tensile strength was carried out on a shoulder rod (0.7-fold) according to DIN 53 455. The modulus in tension was determined according to DIN 53 457. The flow properties of the melt were assessed by measuring the fusion viscosity. The nozzle had a length to thickness ratio (L/D) of B 30:1 unless otherwise indicated.

The test results are summarized in Table 1.

EXAMPLE 1

289.8 g of 4-Hydroxybenzoic acid,
72.5 g of 3-hydroxybenzoic acid,
96.3 g of hydroquinone,
29.1 g of isophthalic acid,
802.2 g of diphenylcarbonate and
0.1 g of magnesium oxide were weighed into a reaction vessel with stirrer, column and distillation bridge.

Evolution of $CO_2$ began at a reaction temperature of 160° C. The reaction temperature was raised to 180° C. in the course of 15 minutes, kept constant for 60 minutes, raised to 220° C. and then kept constant at this level until evolution of $CO_2$ was completed.

The reaction mixture was heated to 250° C. and the pressure in the reactor was lowered stepwise to 30 mbar. After one hour, distillation had slowed down to such an extent that the reaction temperature could be raised to 275° C. and finally to 300° C. After elimination of phenol had been substantially completed, the pressure in the reactor was reduced to 0.2 mbar. The reaction was terminated after one hour under these condensation conditions. Description of product: highly viscous, very strong fibre structure Colour of product: beige The product was worked up at T=330° C. and a mould temperature of T=70° C.

The polyester carbonates summarized in Table 1 were prepared by the method of Example 1.

The properties of the polycarbonates are entered in Table 3.

TABLE 1

| Example | Starting materials | | Processing temperature: Mould temperature |
|---|---|---|---|
| 2 | 207.2 g | 4-hydroxybenzoic acid | 330/70° C. |
|   | 82.9 g | 3-hydroxybenzoic acid | |
|   | 99.1 g | hydroquinone | |
|   | 24.9 g | isophthalic acid | |
|   | 708.5 g | diphenylcarbonate | |
|   | 0.04 g | sodium phenolate | |
| 3 | 207.2 g | 4-hydroxybenzoic acid | 310/70° C. |
|   | 82.9 g | 3-hydroxybenzoic acid | |
|   | 99.1 g | hydroquinone | |
|   | 24.9 g | terephthalic acid | |
|   | 687.6 g | diphenylcarbonate | |
|   | 0.05 g | dibutyldimethoxy tin | |
| 4 | 165.7 g | 4-hydroxybenzoic acid | 300/70° C. |
|   | 41.4 g | 3-hydroxybenzoic acid | |
|   | 165.2 g | hydroquinone | |
|   | 124.6 g | isophthalic acid | |
|   | 819.4 g | diphenylcarbonate | |
|   | 0.05 g | dibutyl tin dilaurate | |
| 5 | 220.8 g | 4-hydroxybenzoic acid | 330/70° C. |
|   | 44.2 g | 3-hydroxybenzoic acid | |
|   | 140.8 g | hydroquinone | |
|   | 79.7 g | isophthalic acid | |
|   | 803.2 g | diphenylcarbonate | |
|   | 0.03 g | titanium tetrabutylate | |
| 6 | 298.1 g | 4-hydroxybenzoic acid | 330/70° C. |
|   | 74.5 g | 3-hydroxybenzoic acid | |
|   | 99.0 g | hydroquinone | |
|   | 785.8 g | diphenylcarbonate | |
|   | 0.05 g | dibutyl tin dilaurate | |
| 7 | 289.8 g | 4-hydroxybenzoic acid | 330/70° C. |
|   | 48.3 g | 3-hydroxybenzoic acid | |
|   | 115.5 g | hydroquinone | |
|   | 29.1 g | terephthalic acid | |
|   | 802.2 g | diphenylcarbonate | |
|   | 0.1 g | magnesium oxide | |
| 8 | 140.8 g | 4-hydroxybenzoic acid | 310/70° C. |
|   | 23.5 g | 3-hydroxybenzoic acid | |
|   | 37.4 g | hydroquinone | |
|   | 31.6 g | 4,4'-dihydroxydiphenyl | |
|   | 14.1 g | terephthalic acid | |
|   | 14.1 g | isophthalic acid | |
|   | 412.2 g | diphenylcarbonate | |
|   | 0.05 g | dibutyl tin dilaurate. | |

The following comparison products were prepared by a method analogous to that of Example 1 but in this case different angular monomers were used as comonomers (Table 2).

TABLE 2

| Comparison Examples | Starting materials | | Processing temperature/ Mould temperature |
|---|---|---|---|
| 1 | 152.5 g | 4-Hydroxybenzoic acid | 330/70° C. |
|   | 9.4 g | hydroquinone | |
|   | 63.2 g | 4,4'-dihydroxydiphenyl | |
|   | 38.8 g | bisphenol A | |
|   | 28.2 g | isophthalic acid | |
|   | 420.2 g | diphenylcarbonate | |
|   | 0.4 g | sodium phenolate | |
| 2 | 290.0 g | 4-hydroxybenzoic acid | 330/70° C. |
|   | 82.6 g | hydroquinone | |
|   | 27.9 g | 4,4'-dihydroxydiphenyl | |
|   | 99.7 g | isophthalic acid | |
|   | 786.6 g | diphenylcarbonate | |
|   | 0.05 g | dibutyl tin dilaurate | |
| 3 | 215.5 g | 4-hydroxybenzoic acid | 330/70° C. |
|   | 52.8 g | hydroquinone | |
|   | 39.6 g | resorcinol | |
|   | 19.9 g | terephthalic acid | |
|   | 550.1 g | diphenylcarbonate | |
|   | 0.1 g | magnesium oxide | |

The properties of the products from Examples 1 to 8 and of the Comparison products (Comparison Examples 1 to 3) are summarized in Table 3.

TABLE 3

| Example No. | Fusion viscosity T = 330° C.; γ = 1000 s⁻¹ Pas | Impact strength /Notched impact strength kJ/m² | Tear resistance MPa | Elongation on stretching % | Modulus in tension MPa | Flexural strength MPa | Edge Fibre elongation % | Modulus of Flexure MPa |
|---|---|---|---|---|---|---|---|---|
| 1 | 80 | 144/40 | 210 | 4.1 | 17500 | 186 | 5.6 | 11000 |
| 2 | 60 | 160/50 | 230 | 3.5 | 13280 | 179 | 5.5 | 8037 |
| 3 | 70 | 148/40 | 235 | 3.2 | 13000 | 201 | 5.1 | 10700 |
| 4 | 65 | 140/45 | 250 | 5.2 | 12300 | 177 | 8.8 | 8000 |
| 5 | 90 | 222/55 | 235 | 4.3 | 19590 | 184 | 5.4 | 12740 |
| 6 | 120 | 204/45 | 420 | 4.1 | 24650 | 206 | 5.4 | 10050 |
| 7 | 115 | 180/40 | 330 | 3.2 | 22430 | 187 | 5.1 | 11150 |
| 8 | 120 | 185/55 | 220 | 3.6 | 16780 | 195 | 5.7 | 12300 |
| Comparison Example | | | | | | | | |
| 1 | 70 | 25/9 | 96 | 2.6 | 3620 | 109 | 5.3 | 4530 |
| 2 | 80 | 26/16 | 130 | 1.5 | 15400 | 116 | 3.7 | 5700 |
| 3 | 100 | 27/15 | 126 | 5.2 | 7400 | 140 | 4.4 | 5160 |

Comparison Examples 1 to 3 show that the structure of the angular monomer unit plays an important role.

For comparable proportions of hydroxybenzoic acid, a small quantity of bisphenol-A used as angular unit is sufficient to produce a marked reduction in rigidity.

When isophthalic acid is used as angular unit, an acceptable modulus in tension is obtained but the elongation at break and toughness are unsatisfactory.

When resorcinol is used as structural unit, the elongation on tearing is improved but all other properties remain unsatisfactory.

We claim:

1. Thermotropic, fully aromatic polyester carbonate comprising
   (a) substituted or unsubstituted aromatic hydroxycarboxylic acid units,
   (b) diphenol units,
   (c) carbonic acid units and
   (d) aromatic dicarboxylic acid units, in which a proportion of the aromatic hydroxycarboxylic acid is present as substituted or unsubstituted 3-hydroxybenzoic acid units (e) and the molar ratios of (a) to (e) are as follows:

$a+b=1$ $b=c+d$ $e/a=0.02-0.50,$ $$\frac{c}{c+d} = 0.2-1;$$

in molar fractions:
   a=0.3–0.95,
   b=0.05–0.7,
   c=0.05–0.30,
   d=0–0.70
   e=0.05–0.50.

2. Polyester carbonate according to claim 1, containing residues of compounds (a) to (e) in random distribution or in blocks.

3. Polyester carbonate according to claim 1, having a melt viscosity of at least 20 Pas at T=330° C., γ=1000 s⁻¹ and a length/thickness ratio of 30:1.

4. Polyester carbonate according to claim 1, having a melt viscosity of at least 40 Pas at T=330° C., γ1000 s⁻¹ and a length/thickness ration of 30:1.

5. Polyester carbonate according to claim 1, wherein the ratio a/e has a value form 0.05 to 0.4.

6. Polyester carbonate according to claim 1, wherein the ration a/e has a value from 0.10 to 0.35.

7. Process for the preparation of thermotropic, aromatic polyester carbonates based on
   (a) substituted or unsubstituted aromatic hydroxycarboxylic acid units,
   (b) diphenol units,
   (c) carbonic acid units and
   (d) aromatic dicarboxylic acid units, in which a proportion of the aromatic hydroxycarboxylic acid is present as substituted or unsubstituted 3-hydroxybenzoic acid units (e) and the molar ratios of (a) to (e) are as follows:

$a+b=1$ $b=c+d$ $e/a=0.02-0.50,$ $$\frac{c}{c+d} = 0.2-1;$$

in molar fractions:
   a=0.3–0.95,
   b=0.05–0.7,
   c=0.05–0.30,
   d=0–0.70 and
   e=0.05–0.50,
   wherein
   (a) a substituted or unsubstituted aromatic hydroxycarboxylic acid,
   (d) an aromatic dicarboxylic acid and
   (e) a substituted or unsubstituted 3-hydroxybenzoic acid are esterified with
   (c) a diarylcarbonate and the aryl ester obtained is transesterified with
   (b) a diphenol, a diarylcarbonate and then polymerised at temperatures from 150° to 350° C. in the presence of from 0.001 to 5 mol-% of catalyst, based on the quantity of carboxylic acid of their derivatives.

8. A molded article, filament, fiber or film produced from polyester carbonates comprising
   (a) substituted or unsubstituted aromatic hydroxycarboxylic acid units,
   (b) diphenol units, (c) carbonic acid units and (d) aromatic dicarboxylic acid units, in which a proportion of the aromatic hydroxycarboxylic acid is present as substituted or unsubstituted 3-hydroxybenzoic acid units (e) and the molar ratios of (a) to (e) are as follows:

$a+b=1$ $b=c+d$ $e/a=0.02-0.50,$ $$\frac{c}{c+d} = 0.2-1;$$

in molar fractions:
 $a=0.3-0.95,$
 $b=0.05-0.7,$
 $c=0.05-0.30,$
 $d=0-0.70$
 $e=0.05-0.50.$ 9. A process according to claim 7, wherein the aryl ester is transesterified in the presence of chain terminating agents.

10. A process according to claim 7, wherein the polymerization is conducted at reduced pressure.

* * * * *